May 19, 1964  F. L. CALHOUN  3,133,638
INSPECTION APPARATUS
Filed June 20, 1960  3 Sheets-Sheet 1

INVENTOR:
Fredrick L. Calhoun

Attorneys.

May 19, 1964  F. L. CALHOUN  3,133,638
INSPECTION APPARATUS
Filed June 20, 1960  3 Sheets-Sheet 2

INVENTOR:
Fredrick L. Calhoun

By Smyth, Roston & Pavitt
Attorneys

United States Patent Office 3,133,638
Patented May 19, 1964

3,133,638
INSPECTION APPARATUS
Fredrick L. Calhoun, Torrance, Calif., assignor to Industrial Dynamics Company, Ltd., Los Angeles, Calif., a corporation of California
Filed June 20, 1960, Ser. No. 37,471
15 Claims. (Cl. 209—82)

This invention relates to inspection apparatus and, more particularly, to apparatus for inspecting the level of liquids in transparent containers such as bottles and jars.

Conventional apparatus which automatically fills containers with the liquid generally measures the amount of liquid introduced to the containers. For a variety of reasons, however, the amount of liquid provided by the equipment into successive containers may vary. If a container is filled with either too much or too little of the liquid, the filled container may be unsuitable for sale or for further processing if such is necessary.

Inspection apparatus has, accordingly, been developed for inspecting the height of the liquid in transparent containers filled by automatic filling apparatus. The operation of these apparatus developed for this purpose generally has been unsatisfactory. The reasons for the unsatisfactory operation of the inspection apparatus are numerous and include variations in the container transmission characteristics, foam on the surface of the liquid, bubbles on the surface of the liquid, or waves on the surface of the liquid. Further, for dark containers and light liquids, such equipment is not operable.

In some of the prior inspection apparatus, a bottle is utilized as a lens for focusing light to a photocell. For such equipment, however, bottles having relatively straight vertically aligned sides must be utilized. For bottles having sloped sides the equipment is inoperable. For these reasons, accordingly, inspection apparatus for monitoring the level of liquid in a transparent container and for automatically rejecting containers in which the liquid level is incorrect have not been satisfactory. Human operators are in the main utilized throughout industries such as the beer, milk, soda, drug, etc. for inspecting the liquid level.

In a specific illustrative embodiment of this invention, an inspection apparatus is provided for monitoring the level of liquid in transparent containers such as bottles and jars and for rejecting containers having either an excess or a deficiency of liquid in the container. The inspection apparatus is highly accurate even in the presence of foam or bubbles at the surface of the liquid or in the presence of surface motion such as due to "sloshing" of the liquid. Surface liquid motion is generally present especially for low viscosity liquids such as alcohol. Considerable surface motion is present when the containers are being moved at a rapid rate.

In the specific illustrative embodiment, two vertically aligned photocells monitor the light provided through an inspection zone from a source of light. The transparent containers pass through the inspection zone between the source of light and the vertically aligned photocells. A third photocell may be utilized to define the inspection zone for the successive containers. When the container enters the inspection zone, the third photocell provides a first pulse and when the container leaves the inspection zone, the third photocell provides a second pulse. A turnstile rotated by the successive bottles may also be utilized to define the inspection zone. The turnstile rotates a light disc which controls the illumination to a photocell.

Features of this invention relate to the utilization of the liquid in the container as a diffusing medium for the light from the source. The two photocells are not directly opposite the light source on the other side of the inspection zone but are displaced at a predetermined distance from such direct opposition. A lens system, including one or more lenses, are provided between the inspection zone and the two photocells for focusing the light at the center of the inspection zone upon an image plane including the sensitive surfaces of the two photocells. The lens system effectively cancels the lens effect of the rounded container or bottle. Lens systems may be utilized to provide an inverted or a non-inverted image upon the image plane. In one specific illustrative embodiment, the image is non-inverted.

With such a lens system, light from the source through a portion of the container, which does not include liquid and through the lens system, does not impinge upon the photocell at that height. In the event the liquid is at its desired level, it diffuses the light from the source to fall upon the lower of the two vertically aligned photocells. Such a condition with light being received at the lower photocell but not at the upper photocell develops a signal which indicates that the particular container being inspected has passed inspection. If an image inverting lens system is utilized, the reverse conditions at the two photocells develops a passed inspection signal.

The third photocell may be utilized to initiate for each container a reject condition. Then at the end of the inspection period when the container leaves the inspection zone, the third photocell completes the reject operation unless the container has passed inspection as determined by the signals developed by the two vertically aligned photocells. A passed or satisfactory level inspection signal developed at any time during the passage of the container through the inspection zone prevents the completion of the reject function by the third photocell.

Due to the fact that the upper of the two vertically aligned photocells does not receive light when the diffused light is provided to the lower of the two photocells, any foam or bubbles at the surface of the liquid increase the accuracy of the detection. The accuracy is increased because the foam or bubbles function to block the transmission of light through the bottle to the upper of the two vertically aligned photocells.

Further features of this invention pertain to the provision of means for accurately determining the level of the liquid even in the presence of "sloshing" or surface movements of the liquid. "Sloshing" of liquid in the container is effectively the presence of a ridge or wave of liquid moving on the surface of the liquid. This is to be contrasted with a depression or valley at the surface of the liquid. The ridge of liquid may destroy the accuracy of the inspection at the instant the ridge crosses the field of view. However, due to the fact that a passed inspection signal can be developed at any time, either before or after the passage of a wave, during the passage of the container through the inspection zone the level of the liquid is accurately monitored. Moreover, due to the fact that the liquid is utilized as the diffusing medium, the relatively thin ridges do not diffuse much light. Small valleys or depressions in the liquid surface due to the "sloshing" do not affect the overall diffusion by the liquid.

Still further features of this invention relate to the provision of means for compensating for variations in the color of successive containers. The color variations change the transmission characteristics of the container. This feature is accomplished by utilizing the pair of vertically aligned photocells which are serially connected at the input of an electrical circuit arrangement responsive to the difference in signals developed by the photocells. In this manner, a change of signal due to a change of transmission characteristics of the container varies the response of both photocells and, accordingly, does not in itself provide for a difference output therefrom.

Further advantages and features of this invention will become apparent upon consideration of the following description when read in conjunction with the drawing wherein.

Referring first to FIGURES 1 through 3 and 7, the inspection apparatus 10 of this invention includes a stationary platform 12 and a movable member 28 which are mounted on two shafts 46 and 47 extending from the platform 12. A conveyor 13 passes over one end of the platform 12 and carries a number of transparent containers 11 adjacent to each other on the conveyor. The containers 11 are illustratively bottles such as beer bottles which have been filled with the respective liquids. The speed of the conveyor 13 may be quite rapid so that the bottles 11 are moved quite rapidly through the inspection apparatus 10. Illustratively, the bottles 11 may be moved at a rate of 750 bottles per minutes on the conveyor 13 through the apparatus 10.

Figure 4:
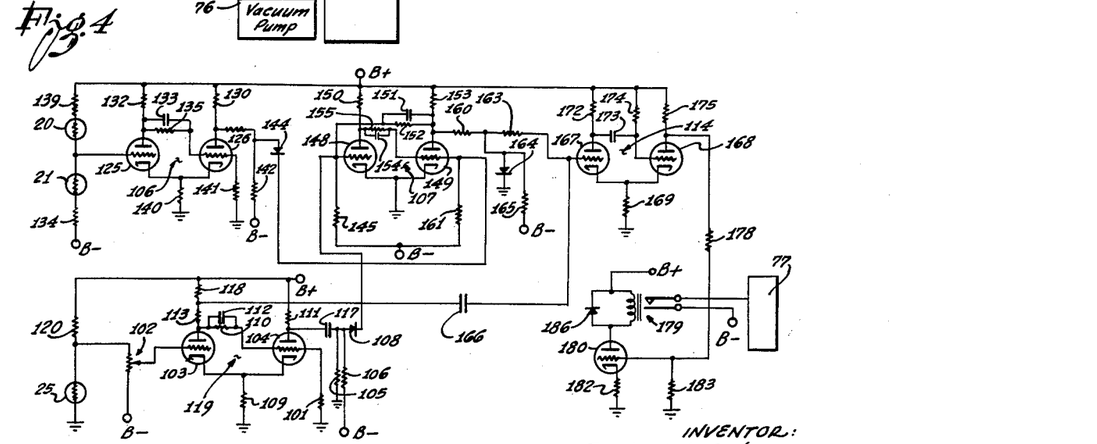
FIGURE 4 is a circuit representation of the electrical equipment utilized in the inspection apparatus of this invention.

The apparatus 10 functions to monitor the liquid level in the bottles 11 and in the event the liquid in any bottle 11 exceeds or is below a predetermined small range of levels, the bottle 11 is automatically rejected. The bottles 11 may be moved on the conveyor 13 at a continuous and rapid speed through an inspection zone defined by the movable member 28. The operation of the system is similar for a stepped conveyor. The member 28 supports a photocell 25 for providing an indication when a bottle 11 enters the inspection zone and providing a second indication when the bottle 11 exits from the inspection zone. The operation of the photocell 25 is hereinafter described in detail in reference to the circuit representation of the inspection apparatus as depicted in FIGURE 4. The member 28 defines a longitudinal slot 28a at its lower side through which the tops of the successive bottles 11 are moved on the conveyor 13.

In addition to the photocell 25, the member 28 also supports an electronic package 14 at one end and a source of radiation 83 at its other end. The package 14 and source 83 are, accordingly, on opposite sides of the inspection zone. The source 83 may be an elongate infrared lamp having a length of approximately seven inches and a diameter of approximately ⅜-inch. The lamp 83 may have a diffused quartz envelope and the radiation of light from the lamp 83 is provided through a slit 84 in a bracket 82 about the lamp 83. The bracket 82 is supported at the bottom of the movable member 28. A vertical line light source is provided in this manner to provide for adjustments so that a sufficient range of liquid heights may be utilized and also to provide a narrow distribution of energy through the bottle 11. Though in the illustrative embodiment a thin beam of light is utilized, different shape beams may be utilized. For example, if only half the bracket 82 is provided to block the light, a sharply demarked light source is provided which may be utilized.

The light source 83 is supported by the member 28 at one side of the inspection zone. At the other side of the inspection zone, the electronic package 14 includes two photocells 20 and 21 and a lens 22 for focusing the light provided from the lamp 83 through the slit 84 and the inspection zone. The lens 22 focuses the light from appoximately the center of the bottle upon an image plane in front of the photocells 20 and 21 so that the line source gives an unfocused projection at the photocells 20 and 21.

A second lens 22a, shown in phantom, may be positioned adjacent the lens 22 to form a composite lens system which provides a non-inverted or direct image at the image plane. If the object lens 22 alone is utilized, the image is inverted. In the following description, it is assumed that a direct or doubly inverted image is provided. The present invention is not restricted, however, to such a system as the principles of operation when an inverted image is provided are identical. The only difference is that the light to the two photocells is reversed.

The movable member 28 may be adjusted on the two cylindrical shafts 46 and 47 by adjusting two nuts 50 which maintain a split bracket 45 in engagement about the shafts 46 and 47. If the split bracket 45 is loosened, the movable member including the lamp 83, and the photocells 20 and 21 may be raised or lowered in accordance with the height of the bottles 11 to be inspected. The bottles 11 pass adjacent two freely rotatable star wheels 30 and 31 which form part of the reject apparatus of the inspection apparatus 10. The successive bottles 11 engage the successive arcuate surfaces 65 of the star wheels 30 and 31 and in the event a bottle 11 is to be rejected a vacuum operated suction disc engages the bottle and rotates it with the star wheels 30 and 31 to a rotating platform 60. The star wheels 30 and 31 are continuously rotated in the direction indicated by the arrow in FIGURE 1 by the successive bottles 11 on the moving conveyor 13 as the successive bottles engage the surfaces 65. Illustratively, the star wheels 30 and 31 may each have twelve arcuate surfaces 65 so that the wheels 30 and 31 are rotated at a speed of 750/12 or 62.5 revolutions per minute.

The continuously rotating star wheels 30 and 31 are mounted on an adjustable platform 29. The platform 29 is slidingly mounted on the stationary platform 12 mentioned above, and it slides along two V-shaped members 34. The position of the platform 29 is adjusted in accordance with the dimensions of the particular bottles 11 being inspected. In this manner, the height of the movable member 28 and the position of the star wheels 30 and 31 may be adjusted in accordance with the size of the containers or bottles 11 to be inspected.

Figure 5:
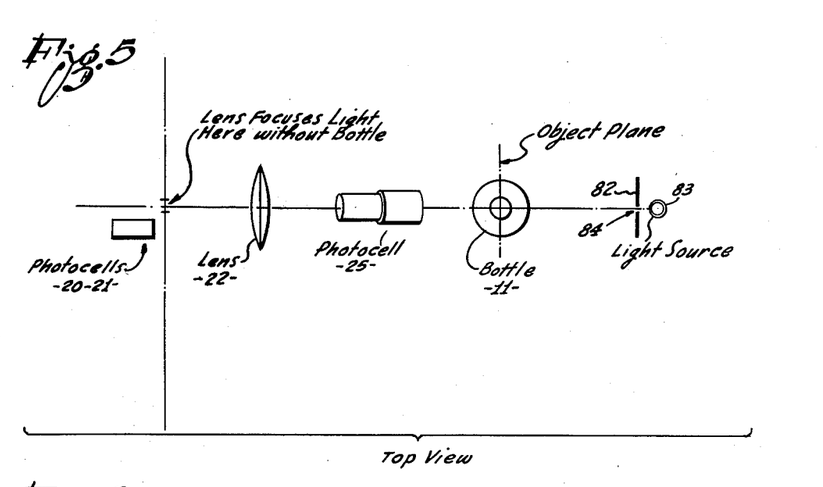
FIGURE 5 is a top functional representation of the optical system utilized in the inspection apparatus of this invention.
Figure 6:
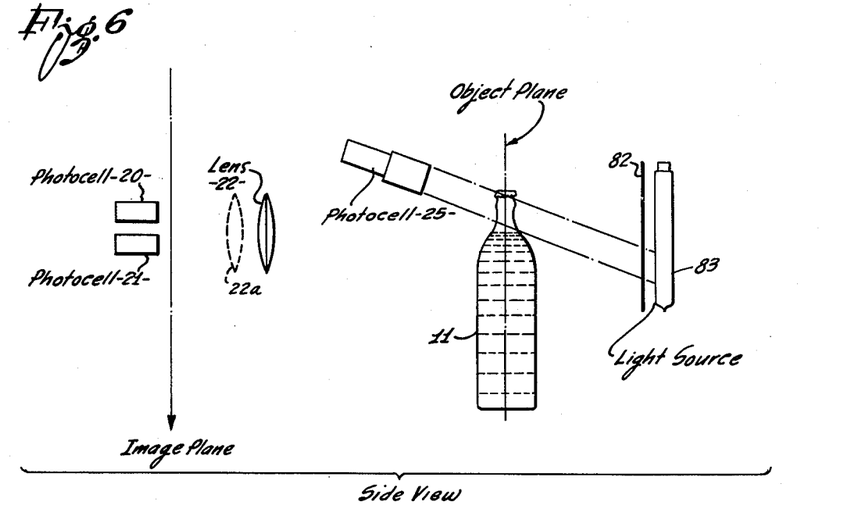
FIGURE 6 is a side functional representation of the optical system utilized in the inspection apparatus of this invention.

Before proceeding with a description of the reject apparatus including the freewheeling star wheels 30 and 31 which are turned by the bottles 11, the optical system utilized in the inspection apparatus 10 is first briefly described. Referring then to FIGURES 5 and 6, the two photocells 20 and 21 are shown vertically aligned at one side of a bottle 11 being inspected and the lamp 83 is shown at the other side. As described above, a photocell 25 is positioned in the movable member 28 for defining the inspection zone and for providing an indication of the beginning and the termination of the passage of each bottle 11 through the zone. FIGURE 6 illustrates the photocell 25 as being above the path of the light from the lamp 83 to the photocells 20 and 21. The photocell 25 is aligned so as to view the bottom of the slit 84 in front of the lamp 83. As the bottles 11 are moved on the conveyor 13 through the inspection zone, they pass through the line of sight of the photocell 25. Accordingly, the light provided from the lamp 83 to the photocell 25 is reduced as the bottle enters the inspection zone and it returns to its normal increased level as the bottle leaves the inspection zone.

The utilization of the arrangement including the photocell 25 to define the inspection zone is merely illustrative. As another illustration, a turnstile, not shown, which may be rotated by the successive bottles 11 is utilized to define the zone. The turnstile may rotate a light disc or gate to control a beam of light to a photocell, none of which are shown. The sensitivity of this latter photocell need not then be changed by different colored bottles. The operation of the system is the same as long as means are provided for defining the inspection zone.

The light from the slit 84 through the inspection zone to the two photocells 20 and 21 inspects the level of the fluid in the bottle 11 utilizing the light diffusing characteristics of the liquid. The lenses 22 and 22a provide for an erect or non-inverted image of the center of the bottle 11 to the photocells 20 and 21. The lenses 22 and 22a in effect cancel the focusing effect of the rounded bottle 11. The level in the bottle 11 is deemed satisfactory when a combination of light is provided to the photocells 20 and 21 such that the sensitive surface of the photocell 20 is not illuminated at the same time that the sensitive surface of the photocell 21 is illuminated. This particular combination indicates that the level of the liquid in the bottle 11 is in a predetermined range of satisfactory levels. If, as is hereinafter described, the bottle 11 is too full, both photocells 20 and 21 will be illuminated at the same time by the passage of the bottle, and if the liquid level is too low in the bottle 11, both photocells 20 and 21 will not be illuminated by the passage of the bottle 11.

Let us assume that the liquid in a bottle 11 is below the desired level. As the bottle moves through the inspection zone it crosses the path of the light from the slit 84 through the inspection zone. When the bottle is exactly centered in the path of the light, the light through the bottle and the lenses 22 and 22a does not impinge upon the two photocells 20 and 21 because, as illustrated in FIGURE 5, the photocells are at one side of the line of center of the path of the light. As the bottle passes through the inspection zone, the light from the split 84 never impinges upon either of the two photocells 20 and 21. The bottle itself does not diffuse or bend the light to cause it to fall upon either of the photocells 20 and 21 and, in fact, tends to focus the light. With neither of the photocells illuminated during the pass of the bottle 11 through the inspection zone, the reject apparatus is operated to reject the bottle 11.

If the level of the liquid in a bottle 11 exceeds the desired level, then as the bottle passes through the inspection zone, the liquid in the bottle 11 diffuses the light from the slit 84 so that some of the light impinges simultaneously on both of the photocells 20 and 21. The diffusion of the light by the liquid in the bottle 11 effectively bends the light so that even though the photocells 20 and 21 are positioned off-center with respect to the path of the light, the light impinges thereon. Due to the fact that the level of the liquid is over the desired level, the light is diffused to impinge upon the photocells 20 at the same time that it impinges upon the photocell 21. For such conditions, the reject apparatus is operated when the bottle 11 leaves the inspection zone.

If the level of the liquid in the bottle 11 is the desired range of levels, the liquid diffuses the light to impinge upon the lower photocell 21 but not upon the upper photocell 20. For this instantaneous combination of conditions with the photocell 21 receiving light but not the photocell 20, a signal is developed indicating that the liquid level in the bottle 11 is satisfactory. Since the photocells 20 and 21 are disposed to respond to the passage of light at different levels, such photocells may be considered as differential means.

FIGURE 4 is a circuit representation of the inspection apparatus 10 and includes the three photocells 25, 20 and 21. As each bottle 11 moves through the inspection zone it cuts across the path from the light source 83 to the photocell 25. The photocell 25, accordingly, provides an indication of when each bottle 11 enters the inspection zone and when it exits from the inspection zone. The photocell 25 enables a reject operation for each bottle 11 as it enters the inspection zone, and the photocell 25 operates the reject apparatus when the bottle 11 leaves the inspection zone if the two photocells 20 and 21 have not developed a signal indicating that the level of the liquid in the bottle 11 is satisfactory.

As shown in FIGURE 4, the photocell 25 is serially connected with a resistor 120 between a positive potential source B+ and a common ground connection. The resistor 120 may have a suitable value such as 150 kilohms and the source B+ may have a suitable value such as plus 150 volts. The photocell 25 and the photocells 20 and 21 as well may be cadmium selenide cells made by the Clairex Company and designated CL–3. The impedance presented by the photocells 25, 20 and 21 in the circuit depends upon the illumination received at their respective sensitive surfaces.

The junction between the resistor 120 and the photocell 25 is coupled to one terminal of a potentiometer 102, the other terminal of which is connected to a negative potential source B—. The impedance across the potentiometer may be 2.5 megohms and the magnitude of the potential of the source B— may be 150 volts. The potentiometer 102 is manually adjustable to change the sensitivity of the circuit in accordance with different light levels. The pulse developed by the photocell 25 responsive to the passage of the neck of the bottle 11 through the inspection zone has a width which is determined by the width of the bottle neck.

The adjustable tap of the potentiometer 102 is coupled to the grid of a triode 103 which may be one-half of a double triode 12AU7. The double triode forms part of a Schmidt trigger circuit 119 which responds to a positive input potential exceeding a predetermined level. The circuit 119, which has a normal and an operate condition, is triggered to its operate condition responsive to the positive input signal, when the input signal decreases below this predetermined value or the Schmidt trigger circuit 119 returns to its normal condition.

The cathodes of the two triodes 103 and 104 of the double triode are connected together and to a grounded cathode resistor 109 which may have a value of 22 kilohms. The anode of the triode 103 is connected through two serially connected resistors 113 and 118 and to the B+ source and the anode of the triode 104 is connected through the resistor 111 to the B+ source. The resistors 113, 118 and 111 may have suitable values such as 68 kilohms, 33 kilohms and 68 kilohms respectively. The anode of the triode 103 is coupled to the grid of the triode 104 by a resistor 110 shunted by a capacitor 112. The resistor 110 may have a suitable value such as 820 kilohms and the capacitor 112 may have a value of 470 micro-microfarads.

When the illumination is blocked by the neck of a bottle 11, the impedance presented by the photocell 25 increases. The potential across the photocell 25, accordingly, increases so that a more positive signal is introduced to the grid of the tub 103. When the triode 103 becomes more conductive, a negative potential is developed at its anode which is coupled to the grid of the triode 104. The grid of the triode 104 is also coupled to a grounded resistor 101 which may have a suitable value such as 330 kilohms. The triode 104, which is normally conductive, accordingly ceases to conduct due to the negative potential at its control grid.

When the triode 104 ceases to conduct, it develops a positive pulse at its anode which is coupled through a capacitor 117 and a diode 108 to a flip-flop circuit 107. The circuit 107 is a bistable arrangement having a first and a second operating condition. The junction between the capacitor 117 and the diode 108 is at the center of a voltage divider formed by two resistors 105 and 106 which are serially connected between the B— potential source and ground. The capacitor 117 and the resistors 105 and 106 may have suitable values such as 0.02 microfarad, 100 kilohms and 270 kilohms respectively. The capacitor 117 and the resistors 105 and 106 function effectively as a differentiating circuit arrangement to develop a positive pulse when the Schmidt trigger circuit 119 is triggered to its operate condition. When the Schmidt trigger 119 is triggered back to its normal condition, a negative pulse is developed by the differentiating circuit arrangement, but the negative pulse is blocked by the diode 108 which is poled to pass only positive pulses.

The circuit 107 includes two triodes 148 and 149 which may be halves of a double triode 12AU7. The positive input pulse from the Schmidt trigger circuit 119 is provided to the control grid of the triode 148. The cathodes of the two triodes 148 and 149 are connected to ground, and the anodes are biased respectively from the B+ positive potential source through resistors 150 and 153. The resistors 150 and 153 may each have a value of 47 kilohms. The anodes of the triodes 148 and 149 are respectively interconnected to the grids of the opposite triodes through resistors 155 and 152 which are shunted by capacitors 154 and 151 respectively. The resistors 155 and 152 may be 390 kilohm resistors and the capacitors 154 and 151 may be 82 micro-microfarad capacitors. The control grids are biased from the B— potential source through resistors 145 and 161 respectively. These resistors may have a suitable value such as 680 kilohms.

Normally, the triode 149 is conductive and the triode 148 is non-conductive. The positive pulse from the Schmidt trigger circuit 119 causes the triode 148 to become conductive and to develop a negative pulse at its anode which is coupled to the control grid of the triode 149. Further, as the triode 149 becomes non-conductive, it develops a positive pulse at its anode which is coupled to the control grid of the triode 148. The action is, accordingly, accumulative and the flip-flop circuit 107 triggers from its first condition to its second condition responsive to the positive input pulse. The flip-flop circuit 107 remains in its second condition unless reset by a pulse to the control grid of a triode 149 by a Schmidt trigger circuit 106.

The Schmidt trigger circuit 106 which may be quite similar to the Schmidt trigger circuit 119, is controlled by the two photocells 20 and 21 described above. The trigger circuit 106 includes two triodes 125 and 126 which may be halves of a double triode 12AU7. The cathodes are coupled to a grounded cathode resistor 140 and the anodes are coupled respectively through resistors 132 and 130 to the B+ potential source. Resistors 132 and 130 may have suitable values such as 100 kilohms and 68 kilohms respectively. The grid of the triode 126 is coupled to ground by a resistor 141, and the control grid of the triode 125 is coupled to the junction between the two photocells 20 and 21. The photocells 20 and 21 are serially connected with two resistors 139 and 134 between the positive potential source and the negative potential source. A 300 volt potential difference is, accordingly, applied across this series circuit. Resistors 139 and 134 may each have suitable values such as 47 kilohms each so that with both photocells 20 and 21 at the same impedance, the potential at the control grid of the triode 125 is at ground potential.

The triode 126 is normally conductive and the triode 125 is normally non-conductive. When light impinges upon the photocell 21 alone, its impedance decreases so that the potential at the control grid of the triode 125 becomes positive. This condition occurs only when the level of the liquid in the bottle 11 being inspected is in the desired range. The photocell 21, as described above, is positioned vertically below the photocell 20. The photocell 21, accordingly, receives illumination at the same instant that the photocell 20 does not receive illumination only when the level of the liquid in the bottle 11 is in a desired range equivalent to the range of heights between the photocells 20 and 21. For any other combination of conditions of illumination of the two photocells 20 and 21, the potential at the control grid of the triode 125 either remains the same or becomes negative so that the Schmidt trigger 106 is not operated.

When the desired level is detected, the positive pulse triggers the Schmidt trigger 106 by causing the triode 125 to become conductive. When the triode 125 becomes conductive, it couples a negative potential through a resistor 135 shunted by a capacitor 133 to the control grid of the triode 126. The value of these components may be similar to the corresponding components of the Schmidt trigger circuit 119. The Schmidt trigger circuit 106, accordingly, operates and develops a positive pulse at the anode of the triode 126. The anode of the triode 126 is coupled through the two serially connected resistors 128 and 142 to the B— potential source. Resistors 128 and 142 may have suitable values such as 680 kilohms and 1.5 megohms respectively. The junction between the two resistors 128 and 142 is directly coupled through a diode 144 to the control grid of the triode 149 described above. The triode 149 is part of the flip-flop circuit 107 which has been operated by the Schmidt trigger circuit 119. The Schmidt trigger circuit 119 is operated to initiate the inspection cycle for the bottle 11.

When the desired level is detected, the positive pulse is coupled from the Schmidt trigger circuit 106 through the diode 144 to reset the flip-flop circuit 107 to its first condition. The flip-flop circuit 107 controls the operation of a monostable circuit 114. When the flip-flop circuit 107 is set to its second condition, it provides an enabling potential through two serially connected resistors 160 and 163 to the control grid of a triode 167 which forms part of the monostable circuit 114. The increase in positive potential at the control grid of the triode 167 functions to enable the monostable circuit 114 for operation. Normally, the control grid of the triode 167 is at a negative potential due to its connection through the resistor 163 and a resistor 165 to the B— potential source. The junction between the resistors 160 and 163 is coupled by a diode 164 to ground so that when a positive potential is provided at the anode of the triode 149, the potential at the control grid of the triode 167 is increased from its negative value to ground potential. The resistors 160, 163 and 165 may have suitable values such as 1 megohm, 220 kilohms and 1.2 megohms respectively.

The triode 167 is one of two triodes 167 and 168 which may be sections of a double triode 12AU7. The control grid of the triode 168 is capacitively coupled to the anode of the triode 167 by a capacitor 173. The anodes are coupled to the positive potential source by resistors 167 and 175 respectively. These resistors may each be 100 kilohm resistors, and the capacitor 173 may have a value of 0.05 microfarad. The two cathodes of the triodes 167 and 168 are connected to a common grounded cathode resistor 169 which may have a value of 22 kilohms, and a biasing resistor 174 is coupled between the positive potential source and the control grid of the triode 168, which may have a value of 1.8 megohms.

The triode 168 is normally conductive due to the biasing connection through the resistor 174. The positive potential provided at the control grid of the triode 167 from the circuit 107 does not cause the triode 167 to become conductive because it is limited by the diode 164 so as not to exceed ground potential. When, however, the Schmidt trigger circuit 119 returns to its normal condition at the end of the inspection cycle for the bottle 11, a positive pulse is provided through a capacitor 166 from the junction of the resistors 118 and 113 which are connected in the anode circuit of the triode 103. The capacitor 166 may have a value of 0.005 microfarad. If the flip-flop circuit 107 is still set in its second condition, the positive pulse from the circuit 119 causes the triode 167 to become conductive and to develop a positive pulse at the anode of the triode 168. The monostable circuit 114, accordingly, operates and it provides a pulse of predetermined duration to a relay amplifier including a triode 180.

The anode of the triode 168 is coupled by a resistor 178 having a suitable value such as 400 ohms to the control grid of the triode 180. A conventional grid leak resistor 183 is coupled to the grid which may have a value of 390 kilohms. The cathode of the triode 180 is connected to ground by a cathode resistor 182 which may have a value of 15 kilohms, and the anode of the triode 180 is coupled to one terminal of the winding of a relay 179. The other terminal of the winding is connected to the B+ supply. The winding of the relay 179 is shunted by a diode 186 poled in a direction to permit the relay 179 to operate when the triode becomes conductive.

Figure 3:
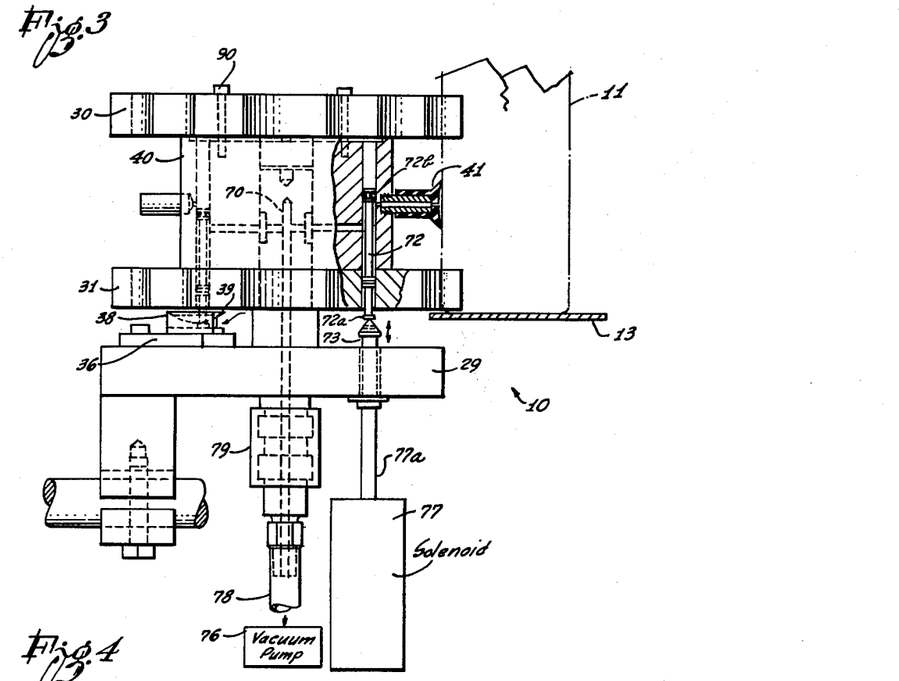
FIGURE 3 is a side view of the reject apparatus utilized in the inspection apparatus of this invention.

When the relay 179 operates, it in turn operates a solenoid 77 which is shown in FIGURE 3 as well as in FIGURE 4. The solenoid 77 is part of the reject apparatus including the two star wheels 30 and 31. Before proceeding with a description of the operation of the reject apparatus responsive to the operation of the solenoid 77, the operation of the circuitry depicted in FIGURE 4 is summarized.

When the bottle 11 enters the inspection zone, the photocell 25 triggers the Schmidt trigger circuit 119 to its operate condition. The circuit 119 in turn sets the flip-flop circuit 107 to its second condition. This condition is effectively a reject condition because the circuit 107 enables the operation of the monostable circuit 114. The flip-flop circuit 107 remains in its reject condition unless it is reset by the photocells 20 and 21. If the photocells 20 and 21 operate, the Schmidt trigger circuit 106 any time during the passage of the bottle 11 through the inspection zone, the circuit 106 resets the flip-flop circuit 107. When the bottle 11 leaves the inspection zone, the Schmidt trigger circuit 119 returns to its normal condition and provides a control potential to the monostable circuit 114. If the circuit 107 is in its reject condition, the monostable circuit 114 is triggered by the circuit 119 to operate the reject apparatus. If the circuit 107 has been reset, the monostable circuit 114 is not operated so that the bottle 11 continues along on the conveyor 13. If the flip-flop circuit 107 is not reset during one inspection cycle, it remains set for the next cycle or until a satisfactory level in a bottle is detected.

Figures 1, 2, 7:
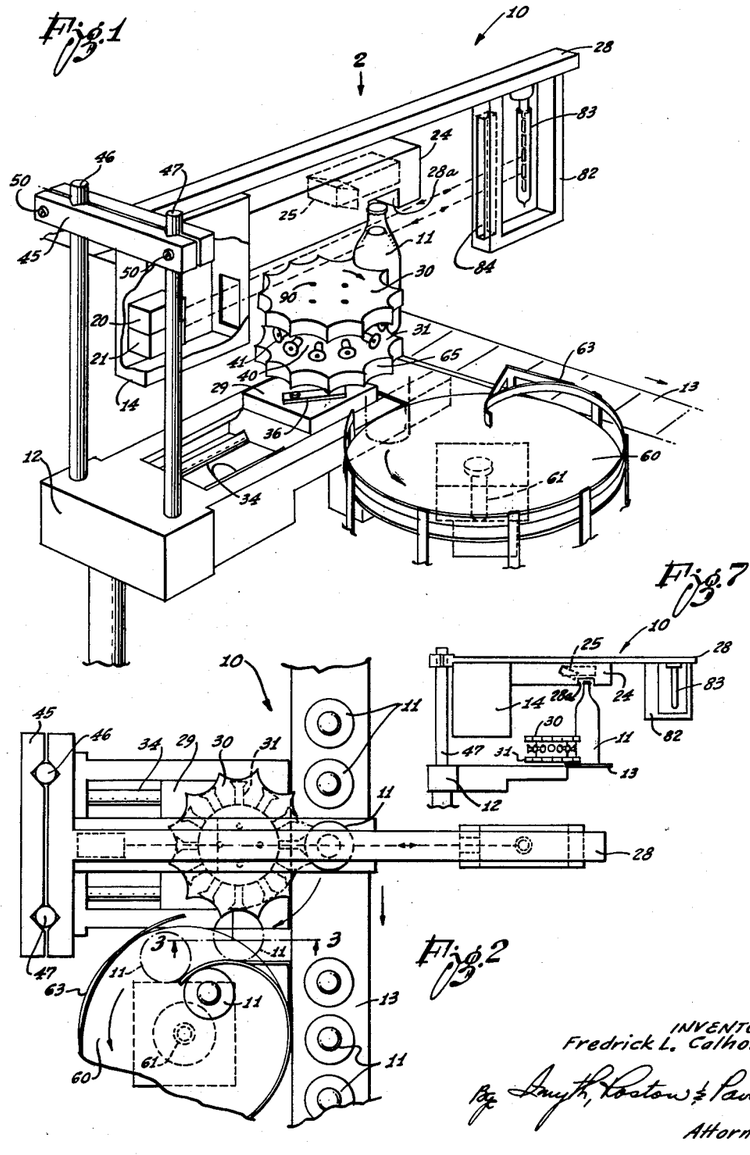
FIGURE 1 is a pictorial view of the inspection apparatus of this invention.
FIGURE 2 is a top view of a portion of the inspection apparatus of this invention.
FIGURE 7 is a reduced front view of the inspection apparatus of this invention.

When the solenoid 77 operates, the bottle 11 is held against the star wheels 30 and 31 and rotated to the platform 60 shown in FIGURE 1. The bottle 11 is held by one of twelve suction discs 41 which extend from the cylindrical member 40 between the two wheels 30 and 31. When the solenoid 77 operates, it moves a plunger 77a upward against a valve 72. The tip 73 of the plunger 77a has a cone shape which functions as a camming surface if the plunger is slightly misaligned. The valve 72 provides for a passage between a main vacuum hose 78 and the suction disc 41 against the bottle 11 just inspected. The vacuum is created by a pump 76 which is coupled through the hose 78, a coupling 79 and a vacuum channel 70 to the valves 72. There is one valve 72 for each of the twelve angular positions of the star wheels 30 and 31. The solenoid 77 is at a position to move the valve 72 associated with the position against which the bottle 11 is positioned.

Each valve 72 has a flange 72a against the end 73 of the plunger 77a which abuts when the solenoid 77 is operated. A central thin area of the valve 72a permits access from the suction disc 41 when the O-ring 72b of the valve 72 is moved over the opening to the suction disc. When the valve 72, accordingly, is in its raised position as depicted in FIGURE 3, the passageway from the suction pump 76 is completed to hold a bottle 11 against the suction disc 41.

As shown in FIGURE 1, the suction disc 41 holds the bottle 11 and rotates it in a clockwise direction onto the rotating platform 60. The platform 60 may be driven by a small synchronous motor, not shown, at the bottom of the platform. As the star wheels 30 and 31 rotate together with the bottle 11, the flange or protrusion 72a at the bottom of the valve 72 engages the surface 39 of a reset cam 38. The surface 39 is sloped so as to move the valve 72 back to its lower position thereby opening the vacuum passage to the bottle 11. The bottle 11 is, accordingly, released as it is carried onto the rotating platform 60.

The platform 60, which is rotated on a shaft 61, rotates the rejected bottle 11 against a bracket 63. The bracket 63 keeps the bottle 11 from rotating even though the platform 60 continues to rotate.

The sequence continues in this manner with bottle 11 after bottle 11 passing through the inspection zone on the conveyor 13. For each bottle 11, a reject condition is initiated, and if the level of the liquid is unsatisfactory, the rejection is completed by rotating the bottle 11 off the conveyor onto the platform 60.

It will be appreciated that the system disclosed in applicant's invention is responsive to a beam of light scattered by the liquid in the bottle being tested. As will be appreciated, this beam of light has coherent properties before being scattered by the liquid in the bottle being tested. The liquid in the bottle being tested operates to scatter a portion of the beam of light on a refractive basis such that the coherent properties of this portion of the beam are maintained. The liquid in the bottle being tested also operates to scatter the remaining portion of the beam on a random or non-coherent basis. It is substantially only the non-coherent portion of the scattered light which is tested in this system to indicate the level of the liquid in the bottle.

Although this invention has been disclosed and illustrated with reference to particular applications, the principles involved are susceptible of numerous other applications which will be apparent to persons skilled in the art. For example, as indicated above, a single object lens 22 may be utilized so that the image is inverted. To pass a bottle, the upper photocell is then illuminated at the same time the lower photocell is not. Further applications are apparent so that the invention is to be limited only as indicated by the scope of the appended claims.

I claim:

1. Apparatus for inspecting the level of liquid in a container wherein the liquid has properties of diffusing energy passing into the liquid, including, a source of energy disposed to direct energy toward the container for passage of the energy into the container and into the liquid in the container, first means disposed relative to the container for receiving only the diffused energy passing from the container at a first particular level of the liquid in the container, second means disposed relative to the container for receiving only the diffused energy passing from the container at a second particular level of the liquid in the container where the second particular level is different from the first particular level, and means operatively coupled to the first and second receiving means for providing an indication of the level of the liquid in the receiving means in accordance with the reception of the diffused energy by the first and second receiving means.

2. Apparatus for inspecting the level of liquid in a container, including, a source of energy disposed to direct energy on a particular axis toward the container for the passage of the energy into the container and into the liquid in the container, first means disposed relative to the container at a position displaced from the particular axis to receive only the energy diffused by the liquid in the container at a first particular level, second means disposed relative to the container at a position displaced from the particular axis to receive only the energy diffused by the liquid in the container at a second particular level different from the first particular level, and means operatively coupled to the first and second receiving means for providing an indication of the level of the liquid in the container in accordance with the energy received by the first and second receiving means.

3. Apparatus for inspecting the level of liquid in a container where the liquid has properties of passing energy, including, a source of energy disposed to direct energy toward the container for the passage of energy into the container and into the liquid in the container and for the diffusion of the energy by the liquid in the container, energy-responsive means disposed relative to the source of energy and responsive to the diffusion of energy by the liquid from the container for producing a signal representing such diffusion of energy, and means operatively coupled to the energy-responsive means for providing an indication as to the level of the liquid in the container in accordance with the production of the signal by the energy-responsive means.

4. Apparatus for inspecting the level of liquid in a container where the liquid has properties of passing energy, including, a source of energy disposed to direct energy toward the container for the passage of energy into the container and into the liquid in the container and for the diffusion of the energy by the liquid in the container, first energy-responsive means disposed relative to the source of energy and to the container and responsive to the diffusion of energy by the liquid in the container for producing first signals representing the diffusion of energy by the liquid from the container at a first particular level in the container, second energy-responsive means disposed relative to the source of energy and to the container and responsive to the diffusion of energy by the liquid in the container for producing second signals representing the diffusion of energy by the liquid from the container at a second particular level in the container different from the first particular level, and means responsive to the different combinations in the production of the first and second signals for indicating whether the level of the liquid is between the first and second levels.

5. Apparatus for inspecting the level of liquid in a container where the liquid has properties of passing energy, including, a source of energy disposed to direct energy toward the container for the passage of energy into the container and into the liquid in the container and for the diffusion of the energy by the liquid in the container, differential means disposed relative to the container and responsive to the diffusion of energy by the liquid from the container for producing signals representing such diffusion of energy at particular levels in the container and for preventing the production of signals upon the occurrence of levels of liquid different from the particular levels, and means operatively coupled to the differential means for providing an indication as to the level of the liquid in the container in accordance with the production or lack of production of the signals by the differential means.

6. Apparatus for inspecting the level of liquid in a container, including,
means disposed relative to the container for illuminating a particular portion of the container at the height desired for the level of the liquid in the container to obtain a scattering of the light by the liquid in the container on a random and a refractive basis,
means including a first photocell positioned relative to the container for receiving substantially only the random portion of the light scattered from a portion of the container above the desired level,
means including a second photocell positioned relative to the container for receiving substantially only the random portion of the light scattered from a portion of the container below the desired level, and
means electrically coupled to both said first and said second photocells and responsive to a predetermined combination of signals from said first and said second photocells for indicating whether the level of the liquid is at the desired height in the container.

7. Apparatus for inspecting the level of liquid in a container, including,
means for projecting a thin beam of light along a particular path,
means operatively coupled to the container for moving the transparent container across the particular path to intercept the thin beam of light and to obtain a scattering of a portion of the thin beam by the liquid in the container on a coherent basis and to obtain a scattering of the remaining portion of the thin beam by the liquid in the container on a non-coherent basis, and
means including a photocell positioned out of the projection path of the coherent portion of the thin beam of light scattered by the liquid in the container and responsive substantially only to the non-coherent portion of the scattered light to produce a signal having characteristics dependent upon the scattered light.

8. Apparatus for inspecting the level of liquid in a container, including,
means for projecting a beam of light along a particular path,
means operatively coupled to the container for moving the container across the particular path to obtain an interruption of the beam of light by the container and to obtain a scattering of a portion of the beam by the liquid in the container on a coherent basis and to obtain a scattering of the remaining portion of the beam by the liquid in the container on a non-coherent basis,
a first photocell positioned out of the particular path of the coherent portion of the beam of light but at a position to receive the non-coherent portion of the light scattered by the liquid in the container at a level below a desired level,
a lens system in the projection path for directing the different light to the photocell from elevation in the container above and below the desired level for the liquid in the container,
a second photocell positioned out of the particular path of the coherent portion of the beam of light but at a position relative to the lens system to receive the the non-coherent portion of the scattered light passing through the lens system from liquid in the container below the desired level, and
means coupled to the first and second photocells for developing a signal upon the reception of the non-coherent portion of the scattered light only at said second photocell to provide an indication that the liquid in the container is at the desired level.

9. Apparatus for inspecting liquid in a container, including,
means for providing a thin beam of light,
means operatively coupled to the container for moving the container across the beam of light to obtain a diffusion of the light by the liquid in the container,
means including a photocell disposed relative to the container for receiving light diffused by the liquid at a particular level in the container,
means for supporting said photocell to receive the light diffused only by the liquid at the particular level whereby said photocell provides a first signal when liquid is in the container at the predetermined level and provides a second signal when liquid is not in the container at the predetermined level, and
means responsive to the signals produced by the photocell for indicating the level of the liquid in the container.

10. Apparatus for inspecting liquid in a container, including,
means for providing a thin beam of light,
means operatively coupled to the container for moving the container across the beam of light to obtain a diffusion of the light by the liquid in the container,
means including first and second photocells disposed relative to the container for receiving light diffused by the liquid at two different levels in the container and for producing signals in accordance with the received light, said first photocell being disposed relative to the container to receive light diffused from a first one of the two different levels and the second photocell being disposed relative to the container to receive light diffused from the second one of the two different levels, and means electrically coupled to said two photocells and responsive to the signals produced by the photocells for providing a signal indicative of a satisfactory liquid level when diffused light is being received by said second photocell at the same time that diffused light is not being received by said first photocell.

11. Apparatus for inspecting the level of liquid in a container, including, means for projecting a beam of light along a particular path, means operatively coupled to the container for moving the container past the particular path to obtain a scattering of the light by the liquid in the container, a pair of photocells positioned relative to the particular path to receive the light from the container and at levels straddling the desired level of the liquid in the container, at least one object lens positioned between the container and the pair of photocells to receive the light diffused by the liquid in the container and to pass such light to the photocells, and means electrically coupled to said pair of photocells for combining the signals from the photocells in a particular relationship to provide an output signal indicating that the level of liquid in the container is satisfactory when light through the lens is received by a first one of the pair of photocells but not by the other.

12. Apparatus for inspecting the level of liquid in a container, including, means for projecting a beam of light along a particular path, means operatively coupled to the container for moving the container past the particular path to obtain a scattering of a portion of the beam of the light by the liquid in the container on a coherent basis and to obtain a scattering of the remaining portion of the beam of light on a non-coherent basis, means including a first photocell disposed relative to the container at a first particular level above a desired level for receiving substantially only the non-coherent portion of the light scattered by the liquid in the container at the first particular level and for producing a signal in accordance with such received light, means including a second photocell disposed relative to the container at a second particular level below the desired level for receiving substantially only the non-coherent portion of the light scattered by liquid in the container at the second particular level and for producing a signal in accordance with such received light, and means coupled to the first and the second photocells for combining the signals from the first and second photocells in a particular relationship to produce an output in accordance with the reception of light at the second photocell but not at said first photocell.

13. Apparatus for inspecting the level of liquid in a container, including, means for projecting a beam of light along a particular path, means for moving the container past the projection path to obtain a diffusion of the light by the liquid in the container, means including a first photocell disposed relative to the container at a first particular level above a desired level for receiving the light diffused by the liquid in the container at the first particular level, means including a second photocell disposed relative to the container at a second particular level below the desired level for receiving the light diffused by the liquid in the container at the second particular level and to produce a signal in accordance with the received light, first means coupled to the first and the second photocells for combining the signals from the first and second photocells in a particular relationship to produce an output signal upon the reception of light at the second photocell but not at said first photocell, second means disposed relative to the particular path for recognizing when the container is moved past the particular path and for providing a first signal when the container starts to move past the path and for providing a second signal when the container completes the movement past the path, and circuit means coupled to said first means and to said second means and responsive to the signals developed by the said first means and by said second means for rejecting the container unless an output signal is developed by said first means in the interval between the production of the first and the second signals by said second means.

14. A method of inspecting the level of liquid in a container, including, directing energy toward the container for diffusion of the energy by the liquid in the receiver, receiving the energy diffused by the liquid in the container, and providing an indication as to the level of the liquid in the container in accordance with the characteristics of the received energy.

15. A method of inspecting the level of liquid in a container, including, directing light toward the container for diffusion of the light by the liquid in the container, receiving the light diffused by the liquid at a first level in the container, receiving the light diffused by the liquid at a second level in the container different from the first level, and providing an indication as to the occurrence of the liquid between the first and second levels in the container in accordance with the relative characteristics of the received light diffused by the liquid in the container at the first and second levels.

References Cited in the file of this patent

UNITED STATES PATENTS

| | | |
|---|---|---|
| 1,737,126 | Reyling | Nov. 26, 1929 |
| 2,085,671 | Powers | June 29, 1937 |
| 2,415,174 | Hurley | Feb. 4, 1947 |
| 2,800,226 | Drennan | July 23, 1957 |
| 2,884,783 | Spengler | May 5, 1959 |
| 2,990,952 | Nigrelli | July 4, 1961 |
| 2,999,589 | Norwich | Sept. 12, 1961 |

UNITED STATES PATENT OFFICE
CERTIFICATE OF CORRECTION

Patent No. 3,133,638            May 19, 1964

Fredrick L. Calhoun

It is hereby certified that error appears in the above numbered patent requiring correction and that the said Letters Patent should read as corrected below.

In the grant (only), line 1, name of inventor, for "Frederick L. Calhoun" read -- Fredrick L. Calhoun --.

Signed and sealed this 24th day of November 1964.

(SEAL)
Attest:

ERNEST W. SWIDER
Attesting Officer

EDWARD J. BRENNER
Commissioner of Patents